Oct. 8, 1940.　　　　A. P. BAKER　　　　2,217,151
AUTOMOBILE DOOR LOCK
Filed July 29, 1938　　　　2 Sheets-Sheet 1

INVENTOR.
Anthony P. Baker
BY Samuel H. Davis
ATTORNEY.

Oct. 8, 1940.　　　A. P. BAKER　　　2,217,151
AUTOMOBILE DOOR LOCK
Filed July 29, 1938　　　2 Sheets-Sheet 2

Inventor
Anthony P. Baker
By Samuel H. Davis
Attorney

Patented Oct. 8, 1940

2,217,151

UNITED STATES PATENT OFFICE 2,217,151

AUTOMOBILE DOOR LOCK

Anthony P. Baker, Lansing, Mich., assignor of one-half to John R. Gaymer, Lansing, Mich.

Application July 29, 1938, Serial No. 222,045

1 Claim. (Cl. 292—36)

This invention relates to automobile locks, more particularly to automobiles the bodies of which are provided with two side doors on either side of the vehicle.

The object of this invention is the production of a lock having special construction and arrangement of its parts, and located between the side doors whereby each of the doors may be locked or unlocked separately from points either externally in front of the doors, or from a part of the automobile situated at a distance from the lock, usually upon the instrument board within reach of the operator.

Accompanying drawings illustrate the special construction and arrangement of the mechanical features of this invention, and Fig. 1 represents a side view of an automobile body with this invention in position thereupon.

Throughout the drawings and description the same number is employed to refer to the same part.

An automobile body 1 has the front and rear side doors 2 and 3 separated by a vertical portion 4 of the body.

Figure 2:
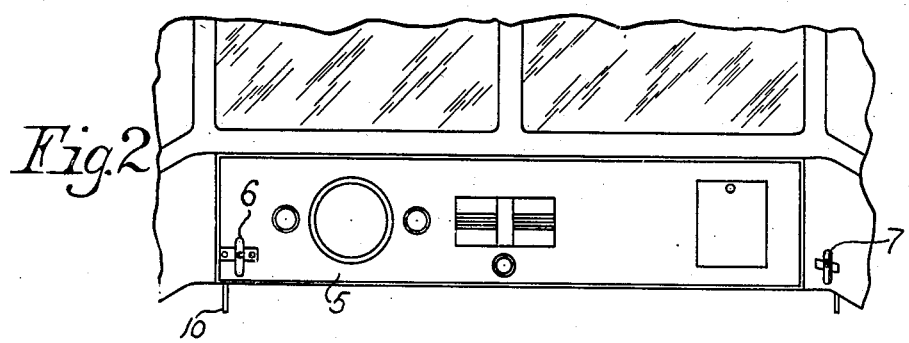
Fig. 2 is a face view of the instrument board of an automobile showing the positions of the operating hand levers of this invention whereby the locks on either side may be controlled from the seat of the operator of the machine.
Figure 3:
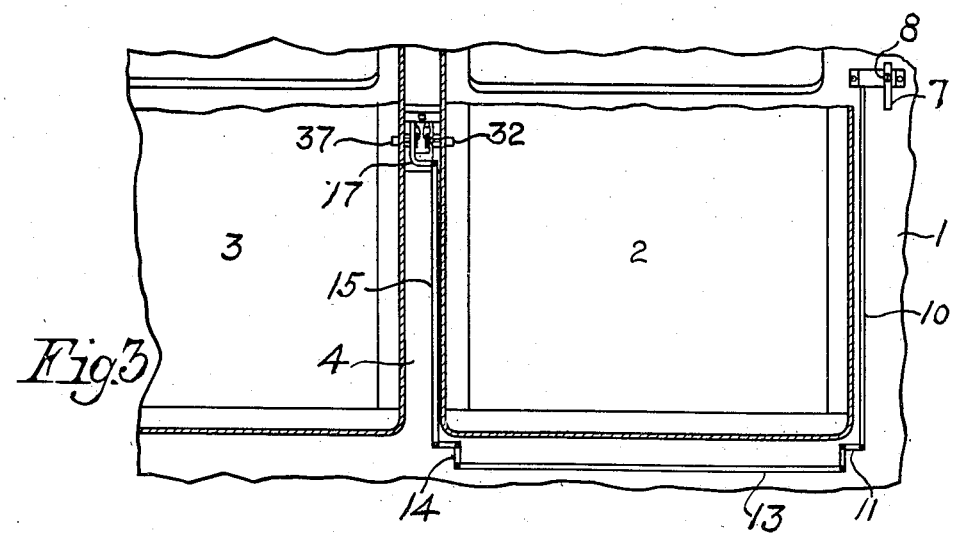
Fig. 3 is a fragmentary inside view partly sectional showing two adjoining side doors with this invention arranged between the doors, and illustrating also the pivotal link connections between one of the hand levers and the lock devices.
Figure 4:
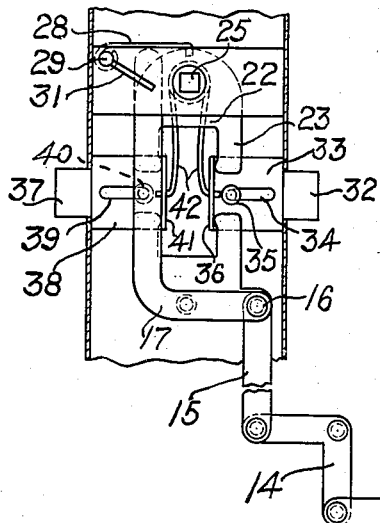
Fig. 4 is a vertical sectional view of the portion of the automobile body between the doors, showing all parts of this invention and the arrangement thereof, with the bolts in locked positions.

As shown in Fig. 2, the instrument board 5 may pivotally carry the operating hand lever 6, or the like lever 7 may be located on the interior of the body, both within easy reach of the operator of the vehicle. No limitation is intended as to the location of levers 6 and 7, and they may be provided with the usual locking means, not shown, but as indicated in Fig. 4. The pivotal stem or shank 8 of the hand levers, the crank 9 thereon, and the pivotal links and connections 10, 11, 12, 13, 14 and 15, are of the same form and arrangement on both sides of the automobile.

Figure 1:
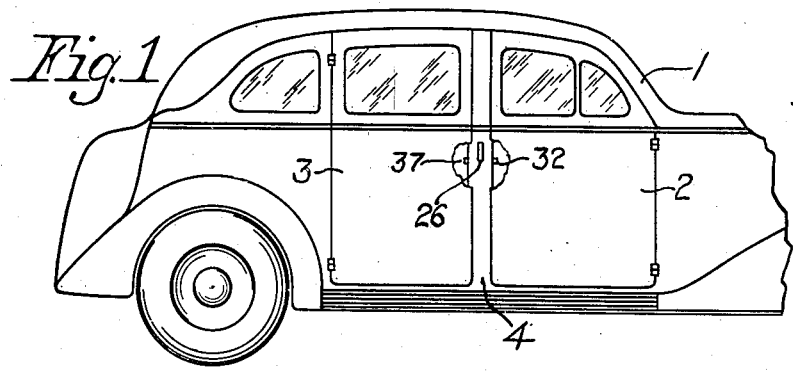
Figure 6:
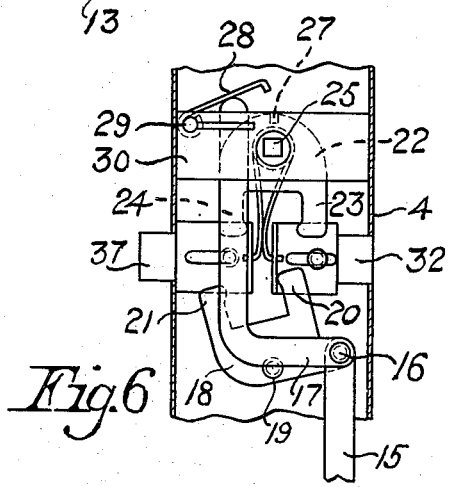
Fig. 6 represents the parts of the lock as set out in Figs. 4 and 5, with the right hand bolt withdrawn, and the parts relatively positioned thereto.

As best shown in Fig. 6 is the pivot pin 16 of sliding L-piece 17 and the lower rocking plate 18. The plate has the projecting fingers 20 and 21. An upper rocking plate 22 has like projecting fingers 23 and 24, and the upper plate is attached to and rocked by the spindle 25 externally operated by the usual handle 26 located on the outside of the body between the doors as shown in Fig. 1. As also shown in Fig. 6 the upper rocking plate 22 has a peripheral notch 27, and a dogging device 28, pivoted at 29 within the lock, is constructed and arranged to engage the notch, from which engagement the dogging device may be lifted by the upward movement of the L-piece 17. A cross piece 30 may be introduced to support the pivot 29 of the dogging device and guide the sliding L-piece 17, and the dogging device is usually provided with a weighted arm 31 whereby the dogging device is held in the notch and in releasable relation.

In Fig. 4 projecting on the right is a sliding bolt 32, which has a plate portion 33 through which is formed a slot 34 extending lengthwise of the plate of the bolt. A pin 35 passing through the slot 34 limits the movement of bolt 32. There will be noted the flange 36 up-turned at the inner edge of the lock plate 33, and the flange is arranged in the paths of the fingers 20, Fig. 6, of the lower rocking plate when that plate is rocked by the operator, and 23 of the upper rocking plate when rocked by the door spindle 25, as shown in Fig. 4. Suitable movement of either rocking plate will, therefore, withdraw right hand bolt 32.

Figure 5:
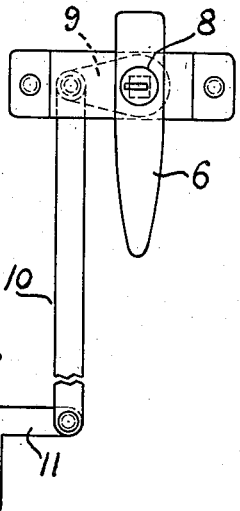
Fig. 5 illustrates the parts of the lock as set out in Fig. 4, with the left hand bolt withdrawn and the relative positions of the assembled parts.
Figure 5:
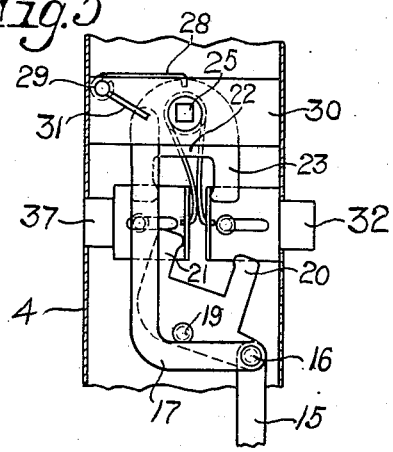

As shown in Fig. 5 the left hand bolt 37 is withdrawn by finger 21 of the lower rocking plate. The bolts are of like construction. Bolt 37 has the plate portion 38 provided with the lengthwise slot 39 engaging the limiting pin 40 passing through the slot. The up-turned flange at the inner edge of the lock plate 38 is marked 41, and this flange is in the paths of the finger 21 of the lower rocking plate, and of the finger 24 of the upper rocking plate.

As ordinarily constructed, and as represented in Fig. 4 the U-spring 42 is coiled about the spindle 25, and the ends of the spring press against the flanges of the lock bolt plates and hold the bolts yieldingly in their locked positions.

In the operation, if the dogging device be raised as shown in the Fig. 6, by turning the hand lever shown in Fig. 4, either rocking plate may be actuated and either bolt drawn, but if the latch is engaged with the notched plate as in Fig. 4, both doors are held until released by the operator. It is not intended to limit this invention to the precise size or form of any part illustrated and described.

Having now described this invention, I claim:

An automobile door lock, comprising two oppositely located bolts, a spring arranged to hold the bolts in releasable locked positions, an externally operated spindle, a rocking plate carried by the spindle within the lock, said plate having spaced projecting fingers, a second plate pivotally supported within the lock and having spaced projecting fingers, said bolts having portions extended into the paths of the fingers of said plates whereby either bolt may be withdrawn against the force of said spring, a lever pivotally supported upon the vehicle body, pivotal link connections extending from said lever to the said second plate, a dogging device, means on said rocking plate adapted to be engaged by said dogging device to restrain rotation of said rocking plate to prevent operation by the externally operated spindle, and a member attached to said link connections adapted to release said dogging device.

ANTHONY P. BAKER.